United States Patent [19]
Simon-Vermot et al.

[11] 3,793,824
[45] Feb. 26, 1974

[54] METHOD FOR MANUFACTURING DIALS FOR WATCHES AND DIALS FOR WATCHES MANUFACTURED ACCORDING TO SAID METHOD

[75] Inventors: Andre Simon-Vermot; Eric M. Hofer, both of Le Locle, Switzerland

[73] Assignee: Les Fabriques d'Assortiments Reunies, Neuchatel, Switzerland

[22] Filed: Aug. 23, 1972

[21] Appl. No.: 282,940

[52] U.S. Cl............................ 58/91, 65/33, 65/60, 161/1, D42/1 B
[51] Int. Cl. ...................... G04b 39/00, C03b 29/00
[58] Field of Search............ 65/33, 60; 58/91; 161/1

[56] References Cited
UNITED STATES PATENTS

| | | | |
|---|---|---|---|
| 3,275,492 | 9/1966 | Herbert | 65/33 X |
| 3,528,828 | 9/1970 | Smith | 65/33 X |
| 3,117,881 | 1/1964 | Henry et al. | 65/33 X |
| 3,146,114 | 8/1964 | Kivlighn | 65/33 X |
| 2,339,975 | 1/1944 | Blau | 65/33 X |
| 3,157,522 | 11/1964 | Stookey | 65/33 X |

*Primary Examiner*—Frank W. Miga
*Attorney, Agent, or Firm*—Imirie & Smiley

[57] ABSTRACT

A glass watch dial is formed from a moldable glass batch comprising a mixture of glass-forming oxides, intermediate oxides, network-modifying oxides, and a devitrifying agent such as a metal oxide or a metal in colloidal dispersion, which is melted, and to which then is added a metal oxide capable of forming colored crystal nuclei of a synthetic mineral in the presence of the devitrifying agent, then the mass is cooled, the batch is molded to a dial and held at elevated temperature above its annealing point to permit the growth of crystallites from various minerals into the glass matrix to form a mineral similar in aspect, chemical composition and crystal structure to a semiprecious stone.

8 Claims, 2 Drawing Figures

3,793,824

METHOD FOR MANUFACTURING DIALS FOR WATCHES AND DIALS FOR WATCHES MANUFACTURED ACCORDING TO SAID METHOD

BACKGROUND OF THE INVENTION

Watch dials made of semiprecious stones are well known and used in high quality watches. Minerals or gems used for the manufacture of such dials are, for example, lapis lazuli, jade, onyx, jasper, opal, cat's eye. In order to make dials, those minerals should be cut, lapped and polished. Holes should be drilled and rounded. All of those operations need the use of expensive diamond tools. Therefore, since the price of the raw material is high and the machining difficult, those dials are expensive and their use is intended only for higher priced jewelry watches.

SUMMARY OF THE INVENTION

The present invention provides dials of synthetic semiprecious stone equally as gorgeous and as attractice as those made of natural gems. Since the raw material is not expensive and the machining shorter and easier this invention enables the manufacturing of attractive jewel watch dials at moderate cost.

In accordance with the present invention, there is provided a novel method for the manufacture of a semiprecious stone dial for watches or other types of timepieces, in which a glass body serves as the basic element, but which provides in the resulting dial product, greater sturdiness and resistance to fracture than is the case with hitherto known dials.

The process of the invention employs three basic ingredients for the production of the dial-forming glass body:

1. at least one glass-producing oxide which forms a glassy network or lattice;
2. intermediate and/or network-modifying oxides; and
3. devitrifying agent which is capable of forming synthetic mineral crystal nuclei or particles in the glass matrix at elevated temperature.

DETAILED DESCRIPTION OF THE INVENTION

Figure 1:
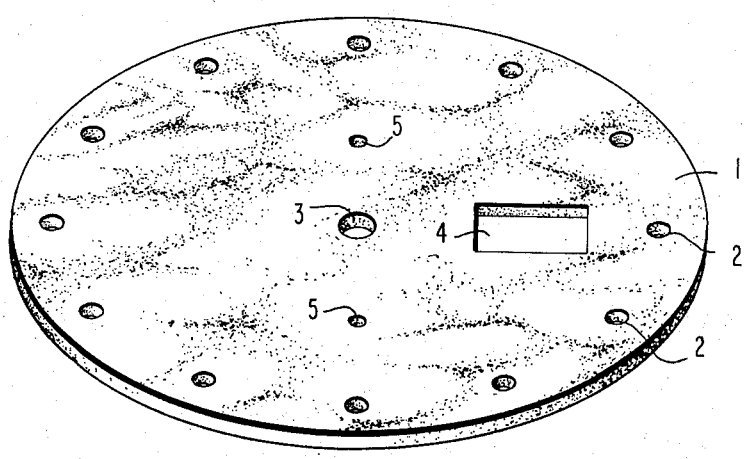
FIG. 1 is a view in perspective of a jewelry watch dial according to the invention.
Figure 2:
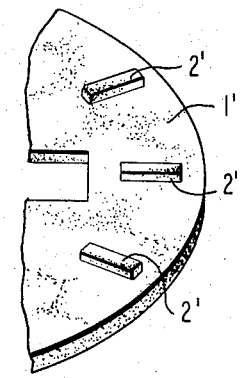
FIG. 2, is a fragmentary view in perspective of a modified jewelry watch dial.

Referring specifically to the drawing, a jewelry dial according to the invention as shown in FIG. 1, comprises a molded or cast dial body 1 which is shown as a typical circular disc but may have any desirable configuration. The body may be formed with suitably located recesses, holes or apertures such as holes 2 for anchoring individual hour indicia, a central bore 3 for the shafts carrying the time indicating hands, a window 4 for displaying calendar indicia, and/or apertures 5 for anchoring a nameplate or the like. The aforementioned openings may be formed during casting or molding, as desired. Alternatively, as shown in FIG. 2, a dial 1' may have indicia 2' formed in situ.

In carrying out the glass manufacturing operation, the different oxides are first admixed with from about 1% to about 20% by weight of the devitrifying agent, and the mixture is melted under controlled conditions at a temperature between about 800° and about 1,400° C until a homogeneous molten mass is obtained. The coloring oxide is then added, and the mass is maintained at a temperature in the range of about 800° C to about 1,400° C. By avoiding agitation, it is possible to obtain a diffusion of the added metal oxides into the interior of the glass, thus producing attractive and ornamental flamed or branched patterns and other ornamental effects.

Thereafter, the glass batch is cast and molded to form a dial of the desired dimensions and shape. The molded dial is then slowly cooled to a temperature below the annealing point of the glass, i.e. until the glass shows a viscosity of about $10^{13}$ poises. The molding may take place at ordinary pressure or at increased pressure, up to several atmospheres.

As a part of the molding step, any desired passages, numeral indicia, sign feet, or signs in relief can be provided, as shown in the drawing.

After molding, the dial is slowly heated again to a temperature slightly above the annealing point of the glass, namely to about 100° to 300° C above the annealing temperature and held at that temperature for about 10 to 1,000 minutes. During this holding period, the growth of crystal nuclei and synthetic mineral particles is promoted. The dial is then allowed slowly to cool to avoid formation of fissures due to thermal shocks.

During this heat treatment, a devitrification of the glass is effected, imparting to the finished dial an aspect of a very fine, non-porous, colored ceramic. This ceramic may have uniform or flame type colorations, depending on whether or not the coloring oxide has been finely admixed with the glass mass. Thus, if cobalt oxide has been used as the coloring oxide, the dials may exhibit flame aspects varying from light blue to navy shades of color.

The presence of the devitrifying agent is believed to aid in the formation of crystal nuclei, which may be colored or not, depending upon the kind of metal oxide present. The heat treatment to which the molded dials are subjected, effects the growth of the crystals and the formation of synthetic semi-precious gems or minerals.

The basic glass material which forms a glassy lattice may be one or more glass-producing inorganic oxides, such as, for example, silicon dioxide $SiO_2$, boron trioxide $B_2O_5$, or germanium oxide $GeO_2$.

The devitrifying agent may be a metal oxide or a metal. Examples of suitable metal oxides are those which provide good crystalline structure and refractory properties to the glass body, including at least one of the following, $TiO_2$, $ZrO_2$, $P_2O_5$, $Cr_2O_3$, $MoO_3$, and $WO_3$. The devitrifying agent may also be a metal in colloidal dispersion, such as ruthenium, rhenium, palladium, osmium, platinum, and indium. The amount of devitrifying agent will be between about 1% and 20% by weight of the original glass-producing oxide. The metal oxides may be added either as such, or in the form of mineral raw materials, such as sand, feldspar, and the like. The colloidal dispersion is produced by known procedures.

The metal oxide component of the glass dial composition is one which is known to be an intermediate or modifier of the basic glass lattice. Such metal oxides include $Al_2O_3$, $Li_2O$, $Na_2O$, $K_2O$, $BeO$, $MgO$, $CaO$, $ZnO$, $SrO$, $CdO$, $BaO$, $PbO$, $NiO$, $CoO$, $FeO$, $MnO$ and $SnO_2$.

Certain of these metal oxides impart to the glass composition a colored shade, which enhances their ornamental appearance. Some oxides are capable of forming crystal nuclei of various minerals. Depending on the desired aspect of the dial, it may be advantageous to add one or more of the coloring metal oxides to the completely melted mass of glass lattice material and devitrifier.

The formation of crystal nuclei and minerals in the glass matrix will depend upon the chemical composition of the starting material. However, X-ray diffraction methods indicate the presence of various crystalline phases, including such minerals as cordierite, rutile, crystallite, aluminum titanate, magnesium titanate, anorthite, anatase, beta-spodumene, mullite, beta-eucryptite, tridymite, petalite, and quartz. These minerals impart to the finished dials an appearance very similar to that of dials manufactured from semiprecious stones and destined for jewelry watches. Thus, the method of the invention can be said to provide for the formation of synthetic semiprecious stones in the glass mass. This is demonstrated by the fact that the appearance of such phases as rutile, anorthite, anatase, petalite, tridymite and quartz is identical with that of the natural products.

The dials obtained by the method of the invention are non-porous, sturdy and much more resistant to fracture than those made of the parent, non-devitrified glass. They can be flame polished or diamond polished, and are readily processed by conventional methods.

The following examples illustrate specific products and ways in which the process can be carried out.

EXAMPLE 1

The oxides for producing semiprecious stone dials were weighed out in the following proportion:

|  | wt percent |
|---|---|
| ZnO | 4.0 |
| $Al_2O_3$ | 8.0 |
| $SiO_2$ | 72.0 |
| $P_2O_5$ | 2.5 |
| $K_2O$ | 1.5 |
| $Li_2O$ | 12.0 |

The materials are mixed together in a conventional manner as by a V blender or pebble mill, then placed in a crucible and heated in a kiln up to 1,300° C. At this temperature the glass is completely melted and the coloring oxides can be added. CoO gives a blue color. A mixture in equal part of CoO and $MnO_2$ gives a different blue. A blue green color is obtained in mixing $Cr_2O_3$ and Co in different proportions. One part of $Cr_2O_3$, two parts of CuO and one part of CoO give an attractive green color.

Mixtures of $Sb_2O_3$, FeO and $SnO_2$ give gold colors of different shades. $Cr_2O_3$ and FeO provide brown colors, $SnO_2$, CaO and $Cr_2O_3$ give a pink color. The weight percent of the added coloring oxides varies between 0.001 and 5% depending on the hue desired.

The crucible is kept in the kiln at the melting temperature for a time varying between 10 and 1,000 minutes, and the coloring oxides are more or less mixed depending on the artistic effect desired.

The dials are then cast in molds being the negative image of the dial, having protuberances or recesses for holes and signs in relief. The dials are now slowly cooled and placed in an annealing furnace and kept at a temperature of 780° C for 12 hours and then cooled slowly to avoid cracks. The material obtained is a fine grained, colored ceramic which aspect when polished is similar to a semiprecious stone. The dials are lapped, if necessary, and polished and signs or other indicia of metal are secured, whereupon the dials are ready for assembly in a watch or other timepiece.

EXAMPLE 2

The oxides for producing semiprecious stone dials were weighed out in the following proportions:

|  | wt percent |
|---|---|
| $SiO_2$ | 55.0 |
| $Al_2O_3$ | 21.0 |
| MgO | 3.0 |
| $Li_2O$ | 6.0 |
| ZnO | 5.0 |
| $TiO_2$ | 10.0 |

The processing is exactly the same as for Example 1 except that the melting temperature is higher (up to 1,400° C) and the annealing temperature is 850° C. The same oxides are used for coloring the batch, the colors being somewhat different from Example 1 due to the different basic composition.

EXAMPLE 3

The oxides for producing semiprecious stone dials were weighed out in the following proportions:

|  | wt percent |
|---|---|
| $SiO_2$ | 60.0 |
| $Al_2O_3$ | 12.0 |
| $TiO_2$ | 14.0 |
| $Li_2O$ | 6.0 |
| MgO | 4.0 |
| CaO | 4.0 |

The process is exactly the same as for Example 2.

EXAMPLE 4

The oxides for producing semiprecious stone dials were weighed out in the following proportions:

|  | wt percent |
|---|---|
| $SiO_2$ | 40.0 |
| $Al_2O_3$ | 13.0 |
| $TiO_2$ | 12.0 |
| BaO | 35.0 |

The process is the same as for Example 1 except that the melting temperature is 1,100° C and the annealing temperature is 675° C. Coloring oxides were the same as for Example 1.

EXAMPLE 5

The oxides for producing semiprecious stone dials were weighed out in the following proportions:

|  | wt percent |
|---|---|
| $SiO_2$ | 18.0 |
| $Al_2O_3$ | 13.0 |
| $TiO_2$ | 11.0 |
| PbO | 58.0 |

The process and the temperatures are the same as for Example 4.

EXAMPLE 6

The oxides for producing semiprecious stone dials were weighed out in the following proportions:

|  | wt percent |
|---|---|
| $SiO_2$ | 40.0 |
| $B_2O_3$ | 10.0 |
| $TiO_2$ | 10.0 |
| PbO | 50.0 |

The process is the same as for Example 1, the melting temperature is 1,000° C, and the annealing temperature is 650° C. The same oxides are used for coloring the batch, the colors being somewhat different from Example 1 due to the different basic composition.

EXAMPLE 7

The oxides for producing semiprecious stone dials were weighed out in the following proportions:

|  | wt percent |
|---|---|
| $SiO_2$ | 5.0 |
| $B_2O_3$ | 15.0 |
| ZnO | 16.0 |
| PbO | 64.0 |

The process is the same as for Example 1, the melting temperature is 950° C, and the annealing temperature is 600° C. The same oxides are used for coloring the batch, the colors being somewhat different from Example 1 due to the different basic composition.

EXAMPLE 8

The oxides for producing semiprecious stone dials were weighed out in the following proportions:

|  | wt percent |
|---|---|
| $Al_2O_3$ | 14.0 |
| $B_2O_3$ | 63.0 |
| CaO | 16.0 |
| $TiO_2$ | 7.0 |

The process is the same as for Example 1, the melting temperature is 900° C, and the annealing temperature is 575° C. The same oxides were used for coloring the batch, the colors being somewhat different from Example 1 due to the different basic composition.

What is claimed is:

1. Method for the manufacture of molded glass timepiece dials, comprising the steps of:
   a. forming a homogeneous molten glass body by melting a mixture of at least one glass-lattice-forming glass-producing oxide and from about 1% to about 20% by weight of a devitrifying agent capable of forming synthetic mineral crystal nuclei or particles in the glass matrix at elevated temperature;
   b. adding to said glass body at a temperature in the range of about 800° C to about 1,400° C an amount of at least one network-modifying metal oxide capable of modifying the glass lattice by forming synthetic mineral crystal particles in the glass matrix at a temperature above the stabilization point of the glass body, and maintaining the molten mass in said temperature range without agitation to obtain diffusion of the added metal oxide into the interior of the glass so as to produce flamed or branched patterns or other ornamental effects therein;
   c. molding the glass body to form a dial including openings, passages, or indicia therein;
   d. heating the molded dial to a temperature slightly above the stabilization or annealing point of the glass for a period of time sufficient to permit the devitrification of the glass and the growth in the glass body of crystal nuclei of a synthetic mineral from said metal oxide; and
   e. slowly cooling the molded dial to avoid the formation of fissures due to thermal shock.

2. The method of claim 1 in which the glass-producing oxide is selected from the group consisting of silicon dioxide, boron trioxide, phosphorus pentoxide, and germanium dioxide.

3. The method of claim 1 in which the devitrifying agent is selected from the group consisting of titanium dioxide, zirconium dioxide, phosphorus pentoxide, chromium oxide, molybdenum trioxide, and tungsten trioxide.

4. The method of claim 1 in which the devitrifying agent is a colloidal dispersion of at least one metal selected from the group consisting of platinum, ruthenium, rhenium, palladium, osmium, and indium.

5. The method of claim 1 in which the network-modifying metal oxide is at least one member selected from the group consisting of aluminum oxide, lithium oxide, sodium oxide, potassium oxide, beryllium oxide, magnesium oxide, calcium oxide, zinc oxide, strontium oxide, cadmium oxide, barium oxide, lead monoxide, nickel oxide, cobalt oxide, ferric oxide, tin dioxide and manganese oxide.

6. The method of claim 1 in which the heat treatment of step (d) is carried out at a temperature about 100° to about 300° C above the stabilization point of the glass for a period of about 10 to 1,000 minutes.

7. The method of claim 1 in which the synthetic mineral formed is at least one member selected from the group consisting of cordierite, rutile, crystallite, aluminum titanate, magnesium titanate, anorthite, anatase, beta-spodumene, mullite, beta-eucryptite, tridymite, petalite and quartz.

8. A dial for timepieces and the like comprising a molded body of a glass prepared in accordance with the method of claim 1.

* * * * *

UNITED STATES PATENT OFFICE
CERTIFICATE OF CORRECTION

Patent No. 3,793,824      Dated February 26, 1974

Inventor(s) Andre Simon-Vermot and Eric M. Hofer

It is certified that error appears in the above-identified patent and that said Letters Patent are hereby corrected as shown below:

IN THE HEADING:

Correct address for Assignee is:

Les Fabriques d'Assortiments Réunies,

Le Locle, Canton of Neuchâtel, Switzerland

Signed and sealed this 15th day of October 1974.

(SEAL)
Attest:

McCOY M. GIBSON JR.
Attesting Officer

C. MARSHALL DANN
Commissioner of Patents